US008043160B2

(12) United States Patent
Dasgupta

(10) Patent No.: US 8,043,160 B2
(45) Date of Patent: Oct. 25, 2011

(54) DOWNLOADABLE OPERATING SYSTEM FOR WAGER GAMING SYSTEMS

(75) Inventor: Ranjan Dasgupta, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 443 days.

(21) Appl. No.: 12/299,692

(22) PCT Filed: May 2, 2007

(86) PCT No.: PCT/US2007/010740

§ 371 (c)(1),
(2), (4) Date: Nov. 5, 2008

(87) PCT Pub. No.: WO2007/133468

PCT Pub. Date: Nov. 22, 2007

(65) Prior Publication Data

US 2009/0181764 A1 Jul. 16, 2009

Related U.S. Application Data

(60) Provisional application No. 60/746,674, filed on May 8, 2006.

(51) Int. Cl.
*G06F 17/00* (2006.01)

(52) U.S. Cl. ........................................................ 463/42

(58) Field of Classification Search .............. 463/40–42, 463/16–29; 709/205

See application file for complete search history.

(56) References Cited

U.S. PATENT DOCUMENTS 5,755,621 A 5/1998 Marks et al.
5,762,552 A 6/1998 Vuong et al.
5,823,879 A 10/1998 Goldberg et al.
5,871,398 A 2/1999 Schneier
6,024,640 A 2/2000 Walker et al.
6,607,439 B2 8/2003 Schneier
6,811,488 B2 11/2004 Paravia et al.
6,863,612 B2 3/2005 Willis (Continued)

FOREIGN PATENT DOCUMENTS

WO WO-2007011636 A2 1/2007

(Continued)

OTHER PUBLICATIONS

"International Application Serial No. PCT/US2007/010740, Search Report and Written Opinion mailed Aug. 12, 2008", 9 pgs.

(Continued)

*Primary Examiner* — Ronald Laneau

(74) *Attorney, Agent, or Firm* — Schwegman, Lundberg & Woessner, P.A.

(57) ABSTRACT

This disclosure describes embodiments of a wagering game machine that includes a wager gaming operating system including downloadable components. This disclosure also describes methods for downloading such components. In one embodiment, the method includes booting the wagering game machine for operation, wherein the booting is performed in-part by core operating system components. The method can also include downloading, over a network, a non-core operating system component, wherein the downloading is performed with assistance from the core operating system components. The method can also include installing the non-core operating system component on the wagering game machine, wherein the installing is performed by the core operating system components. The method can also include presenting a wagering game upon which monetary value can be wagered, wherein the presenting is performed in-part by the non-core operating system component.

18 Claims, 8 Drawing Sheets

U.S. PATENT DOCUMENTS

| | | | | |
|---|---|---|---|---|
| 7,163,459 | B2 | 1/2007 | Tanskanen | |
| 2002/0049909 | A1 | 4/2002 | Jackson et al. | |
| 2002/0057800 | A1 | 5/2002 | Gordon et al. | |
| 2003/0064771 | A1 | 4/2003 | Morrow et al. | |
| 2003/0130027 | A1 | 7/2003 | Aida | |
| 2003/0131246 | A1 | 7/2003 | Reeves et al. | |
| 2004/0224777 | A1 | 11/2004 | Smith et al. | |
| 2004/0248646 | A1* | 12/2004 | Canterbury | 463/29 |
| 2006/0173985 | A1 | 8/2006 | Moore | |
| 2006/0240888 | A1* | 10/2006 | Tanimura | 463/20 |
| 2006/0264256 | A1 | 11/2006 | Gagner et al. | |
| 2008/0220848 | A1 | 9/2008 | Adiraju et al. | |
| 2010/0130287 | A1 | 5/2010 | Dasgupta et al. | |
| 2010/0248816 | A1* | 9/2010 | Liber et al. | 463/25 |
| 2010/0311500 | A1* | 12/2010 | Canterbury et al. | 463/29 |

FOREIGN PATENT DOCUMENTS

| | | | |
|---|---|---|---|
| WO | WO-2007011636A23 | | 1/2007 |
| WO | WO-2008008325 | A2 | 1/2008 |
| WO | WO-2008008325 | A3 | 1/2008 |

OTHER PUBLICATIONS

"International Application Serial No. PCT/US2007/015711, Search Report and Written Opinion mailed on Aug. 27, 2008", 13 pgs.

"U.S. Appl. No. 11/966,124, Non Final Office Action mailed Feb. 7, 2011", 13 pgs.

"U.S. Appl. No. 11/996,124, Response filed May 5, 2011 to Non Final Office Action mailed Feb. 7, 2011", 15 pgs.

"International Application Serial No. PCT/US2007/015711, International Preliminary Examination Report mailed on Feb. 6, 2009", 13 pgs.

* cited by examiner

DOWNLOADABLE OPERATING SYSTEM FOR WAGER GAMING SYSTEMS

RELATED APPLICATION

This patent application is a U.S. National Stage Filing under 35 U.S.C. 371 from International Patent Application Serial No. PCT/US2007/010740, filed May 2, 2007, and published on Nov. 22, 2007, as WO 2007/133468 A2, which claims the priority benefit of U.S. Provisional Patent Application Ser. No. 60/746,674 filed May 8, 2006 and entitled "DOWNLOADABLE OPERATING SYSTEM FOR WAGER GAMING SYSTEMS", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wager gaming systems, and more particularly to wager gaming systems including downloadable wager gaming operating system components.

BACKGROUND

Wagering game machine makers continually provide new and entertaining games. One way of increasing entertainment value associated with casino-style wagering games (e.g., video slots, video poker, video blackjack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data.

When distributing new wagering game content to wagering game machines in the field, wagering game machine operators typically manually deliver the content to each wagering game machine. For example, when deploying new wagering game content, operators typically replace existing media (e.g. ROM, CD-ROM, or flash RAM) with new media containing updated wagering game content. For wagering game machine operators owning scores of machines, this process can be relatively laborious and expensive.

BRIEF DESCRIPTION OF THE FIGURES

The present invention is illustrated by way of example and not limitation in the Figures of the accompanying drawings in which.

DESCRIPTION OF THE EMBODIMENTS

This description presents embodiments of a wagering game machine that includes a wager gaming operating system including downloadable components. This description of the embodiments is divided into five sections. The first section provides an introduction to embodiments of the invention. The second section describes an example operating environment, whereas the third section describes example operations performed by embodiments of the invention. The fourth section describes an example wagering game machine, while the fifth section presents some general comments.

Introduction

Figure 1:
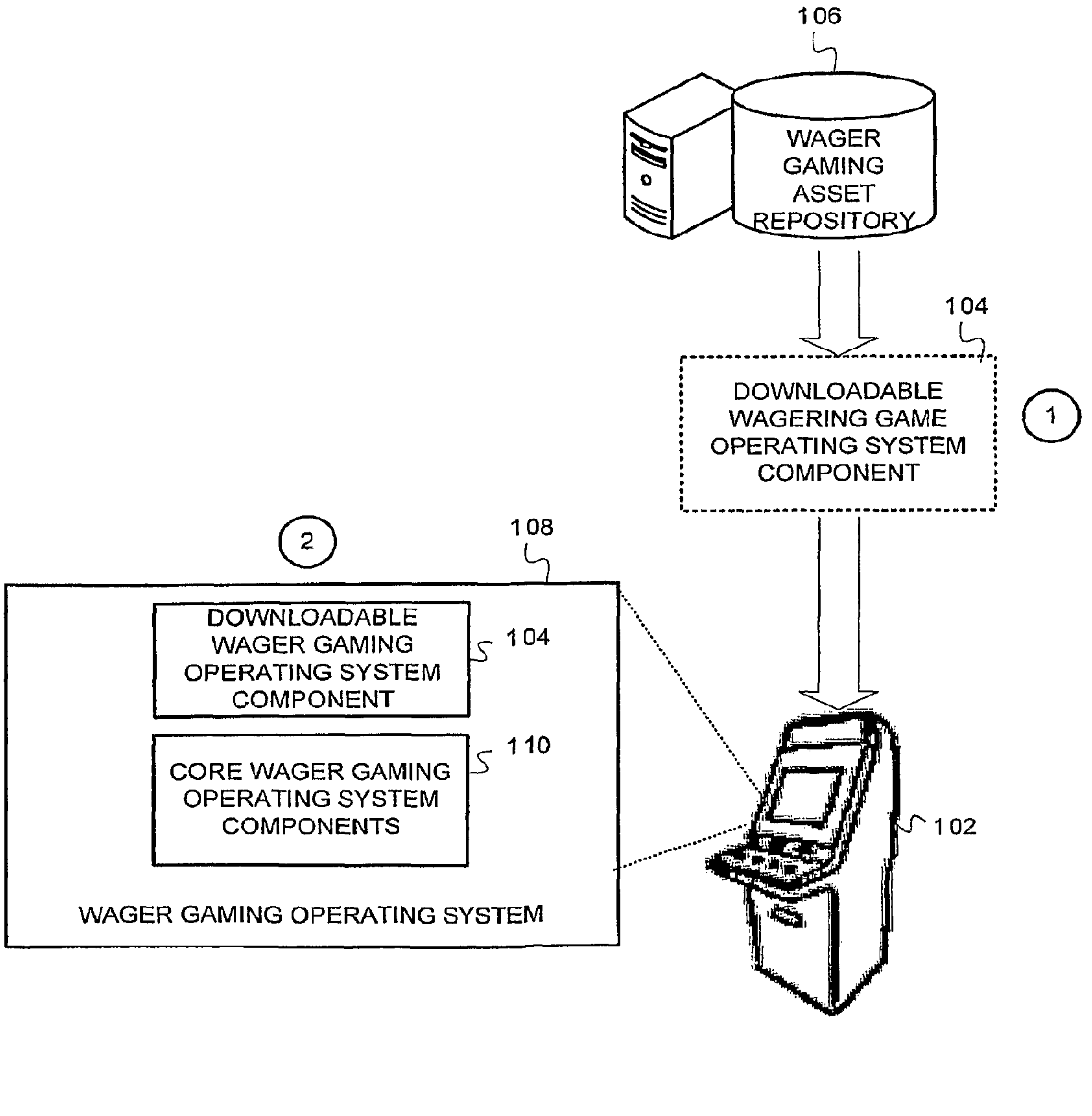
FIG. 1 is a block diagram showing dataflow and operations for distributing a downloadable wager gaming operating system component, according to example embodiments of the invention.

This section provides an introduction to some embodiments of the invention. In one embodiment, a wagering game machine includes a wager gaming operating system that has core components and downloadable components. In one embodiment, the core components can be installed before the wagering game machine is deployed into the field (e.g., at the factory), while the downloadable components can be added after the machine is running in the field (e.g., at a casino). Thus, embodiments enable wagering game machine operators to distribute new and/or different downloadable operating system components over communications networks, eliminating overhead associated with technicians manually changing operating system components in the field. FIG. 1 describes this concept.

FIG. 1 is a block diagram showing dataflow and operations for distributing a downloadable wager gaming operating system component, according to example embodiments of the invention. The dataflow and operations occur in two stages. During stage one, the wagering game machine 102 receives a downloadable wager gaming operating system component 104 from a wager gaming asset repository 106. The download can occur over wired or wireless communication links.

At stage two, the wager gaming operating system's core components 110 install the downloadable wager gaming operating system component 104 into the wager gaming operating system 108. The download and installation can occur without rebooting the wagering game machine 102 and/or it can occur in the background while the machine 102 is presenting wagering games (e.g., slots, video poker, etc.). These and other features will be described in the following sections.

Example Operating Environment

This section describes an example operating environment in which embodiments of the invention can be practiced. This section will discuss an example wagering game machine architecture, example wagering game machine network and example wireless environment.

Example Wagering Game Machine Architecture

Figure 2:
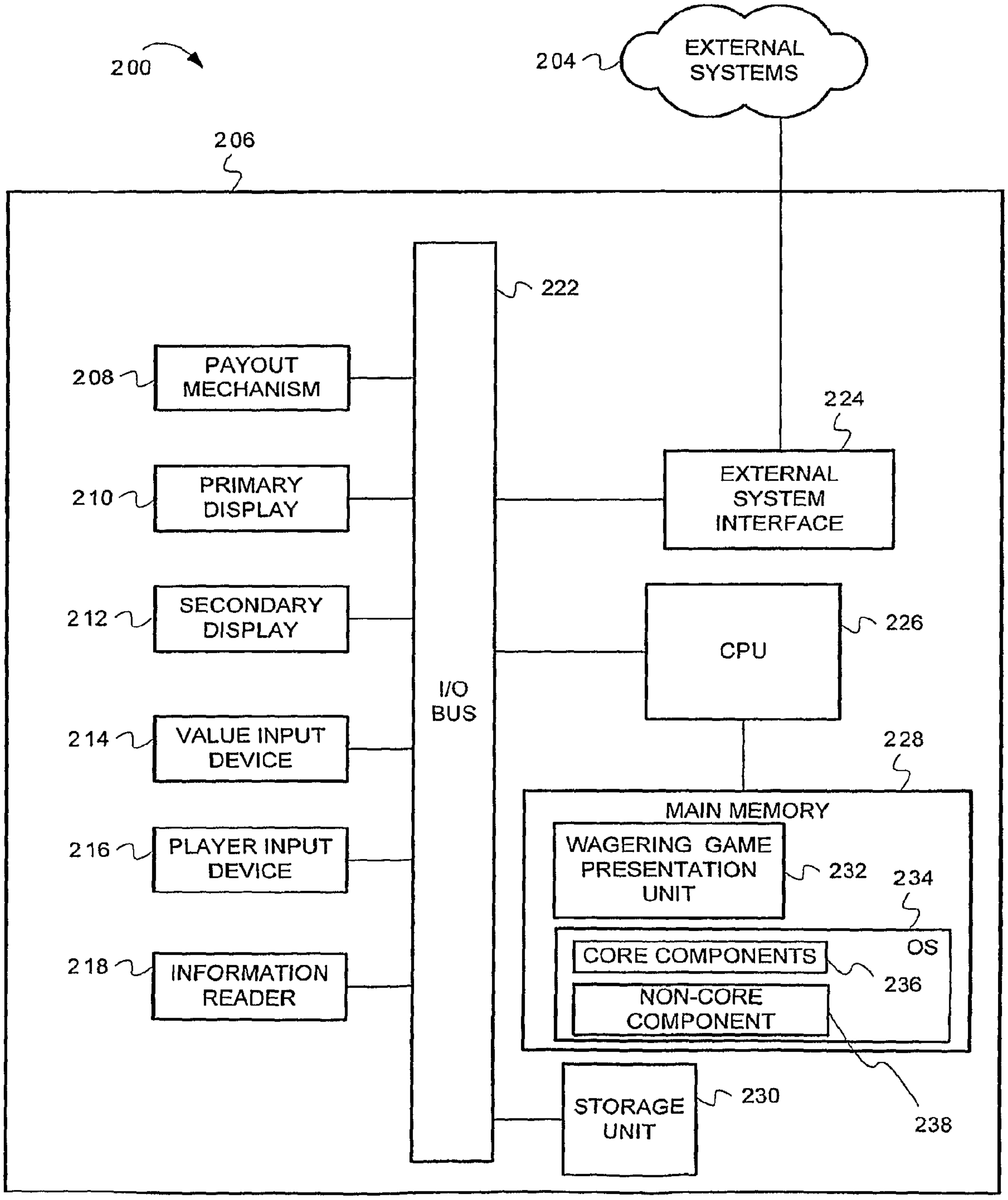
FIG. 2 is a block diagram illustrating a wagering game machine architecture, according to example embodiments of the invention.

FIG. 2 is a block diagram illustrating a wagering game machine architecture, according to example embodiments of the invention. As shown in FIG. 2, the wagering game machine architecture includes a wagering game machine 206 including a central processing unit (CPU) 226 connected to main memory 228. The main memory 228 includes a wagering game presentation unit 232 and wager gaming operating system 234. In one embodiment, the wagering game presentation unit 232 can present wagering games, such as video poker, video blackjack, video slots, video lottery, etc., in whole or part.

The wager gaming operating system 234 includes core components 236 and a non-core component 238. In one embodiment, the core components 236 boot the wagering game machine 206 and initialize it for operation. Additionally, the core components can facilitate downloading of the non-core component 238. In one embodiment, the core components 236 can download and install the non-core component 238 without rebooting. The non-core components 238 can include modules that provide services (e.g., media presentation services, kernal configuration services, etc.) to the wager gaming operating system's core components 236 and the wagering game presentation unit 232. For example, the wagering game presentation unit 232 employs the non-core components 238 to present video content on the primary display 210.

The CPU 226 is also connected to an input/output (I/O) bus 222, which facilitates communication between the wagering game machine's components. The I/O bus 222 is connected to a payout mechanism 208, primary display 210, secondary display 212, value input device 214, player input device 216, information reader 218, and storage unit 230 (e.g., EEPROM, hard disk drive, flash RAM, etc.). The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and multiple CPUs 226. In one embodiment, any of the components can be integrated or subdivided. Additionally, in one embodiment, the components of the wagering game machine 206 can be interconnected according to any suitable interconnection architecture (e.g., directly connected, hypercube, etc.).

In one embodiment, any of the components of the wagering game machine 206 (e.g., the wagering game presentation unit 232) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 3:
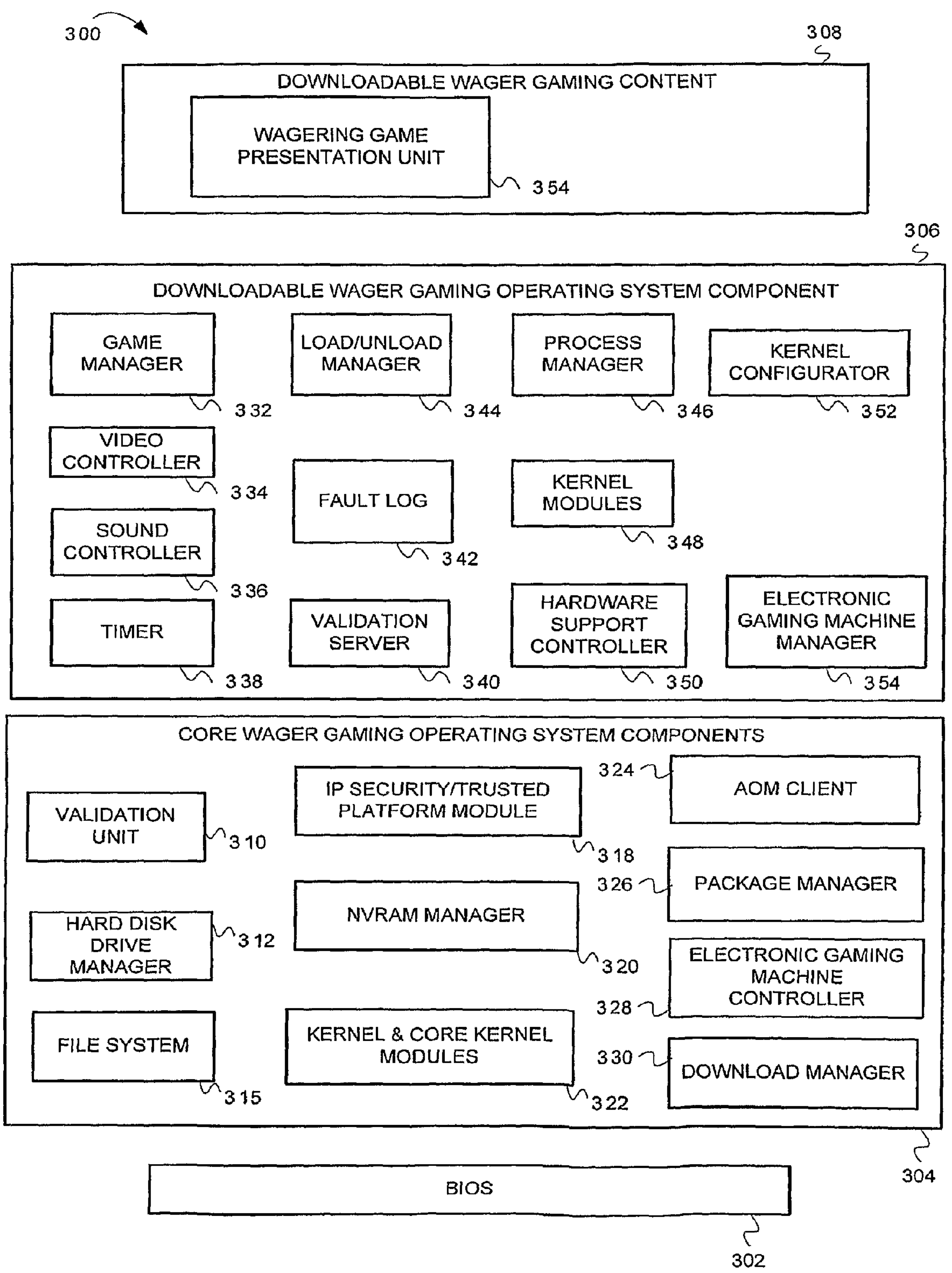
FIG. 3 is a block diagram illustrating example wagering game machine components including an operating system that includes core components and downloadable components.

FIG. 3 is a block diagram illustrating example wagering game machine components including an operating system that includes core components and downloadable components. In FIG. 3, the wagering game machine software 300 includes a basic input output system (BIOS) 302, core wager gaming operating system components 304, downloadable wager gaming operating system components 306, and downloadable wagering game content 308. The core wager gaming operating system components include a validation unit 310, hard disk drive manager 312, file system 315, Internet Protocol security/trusted platform module 318, NVRAM manager 320, kernel and core kernel modules 322, AOM client 324, package manager 326, electronic gaming machine controller 328, and download manager 330. The downloadable wager gaming operating system components 306 include a game manager 332, video controller 334, sound controller 336, timer 338, validation server 340, fault log 342, load/unload manager 344, process manager 346, kernel modules 348, hardware support controller 350, kernel configurator 352, and an electronic gaming machine manager 354. The downloadable wagering game content 308 includes a wagering game machine presentation unit 354. The following sections will describe operations performed by some of these components.

Figure 4:
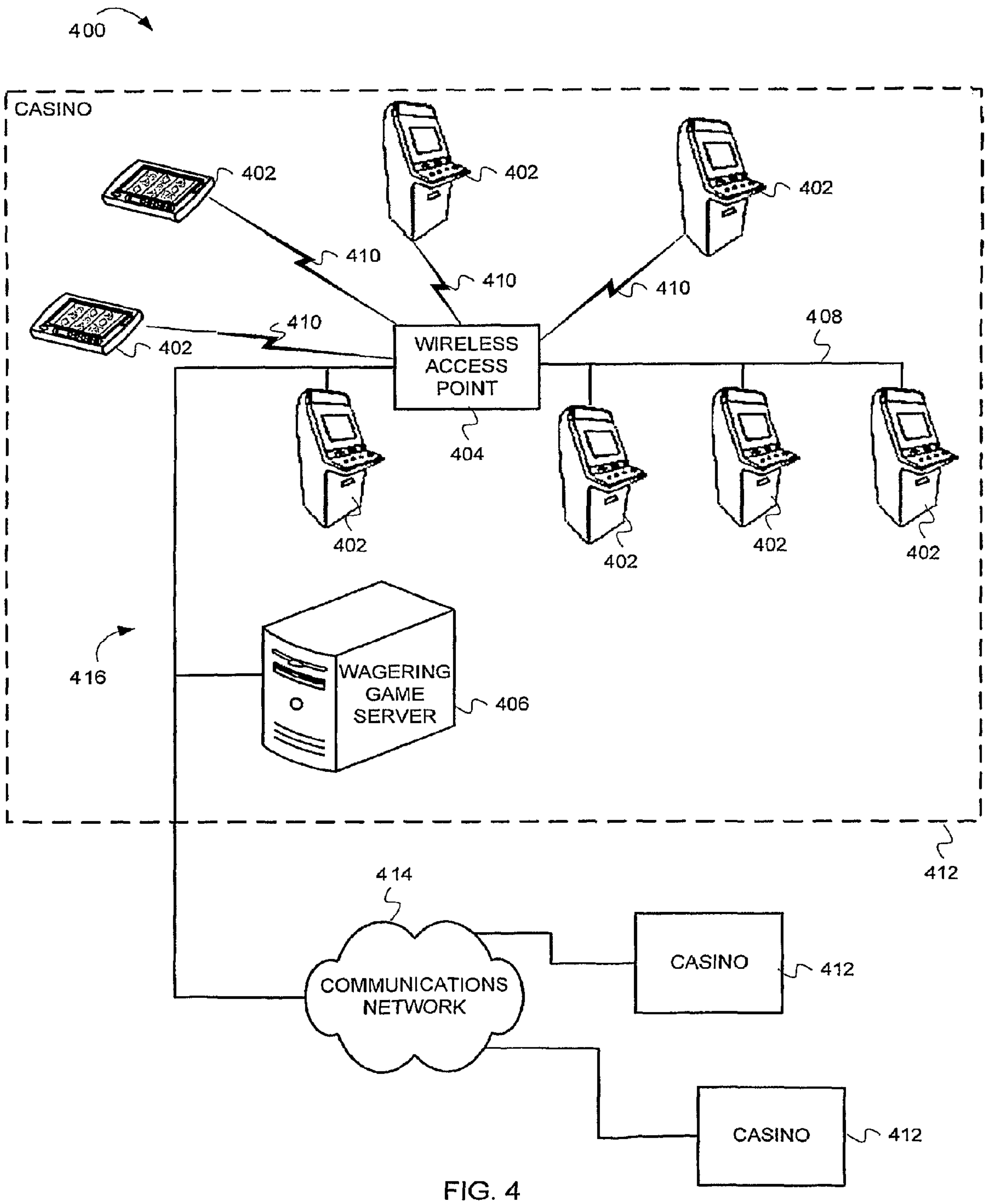
FIG. 4 is a block diagram illustrating a wagering game network, according to example embodiments of the invention.

While FIGS. 2 and 3 describe example embodiments of a wagering game machine architecture, FIG. 4 shows how a plurality of wagering game machines can be connected in a wagering game network.

Example Wagering Game Network

FIG. 4 is a block diagram illustrating a wagering game network, according to example embodiments of the invention. As shown in FIG. 4, the wagering game network 400 includes a plurality of casinos 412 connected to a communications network 414.

Each of the plurality of casinos 412 includes a local area network 416, which includes a wireless access point 404, wagering game machines 402, and a wagering game server 406 that can serve wagering games over the local area network 416. As such, the local area network 416 includes wireless communication links 410 and wired communication links 408. The wired and wireless communication links can employ any suitable connection technology, such as Bluetooth, 802.11, Ethernet, public switched telephone networks, SONET, etc. In one embodiment, the wagering game server 406 can serve wagering games and/or distribute content to devices located in other casinos 412 or at other locations on the communications network 414.

The wagering game machines 402 and wagering game server 406 can include hardware and machine-readable media including instructions for performing the operations described herein. For example, the wagering game machines 402 and wagering game server 406 can include a wager gaming operating system including core components and downloadable components.

The wagering game machines 402 described herein can take any suitable form, such as floor standing models, handheld mobile units, bartop models, workstation-type console models, etc. Further, the wagering game machines 402 can be primarily dedicated for use in conducting wagering games, or can include non-dedicated devices, such as mobile phones, personal digital assistants, personal computers, etc. In one embodiment, the wagering game network 400 can include other network devices, such as accounting servers, wide area progressive servers, player tracking servers, and/or other devices suitable for use in connection with embodiments of the invention.

Example Wireless Environment

In some embodiments, the wireless access point 404 and wagering game machines 402 can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point 404 and wagering game machines 402 can communicate in accordance with a broadband multiple access technique, such as orthogonal frequency division multiple access (OFDMA). In some embodiments, the wireless access point 404 and wagering game machines 402 can communicate using spread-spectrum signals.

In some embodiments, the wireless access point 404 can be part of a communication station, such as wireless local area network (WLAN) communication station including a Wireless Fidelity (WiFi) communication station, or a WLAN access point (AP). In these embodiments, the wagering game machines 402 can be part of a mobile station, such as WLAN mobile station or a WiFi mobile station.

In some other embodiments, the wireless access point 404 can be part of a broadband wireless access (BWA) network communication station, such as a Worldwide Interoperability for Microwave Access (WiMax) communication station, as the wireless access point 404 can be part of almost any wireless communication device. In these embodiments, the wagering game machines 402 can be part of a BWA network communication station, such as a WiMax communication station.

In some embodiments, any of the wagering game machines 402 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the frequency spectrums for the communication signals transmitted and received by the wireless access point 404 and the wagering game machines 402 can comprise either a 5 gigahertz (GHz) frequency spectrum or a 2.4 GHz frequency spectrum. In these embodiments, the 5 GHz frequency spectrum can include frequencies ranging from approximately 4.9 to 5.9 GHz, and the 2.4 GHz spectrum can include frequencies ranging from approximately 2.3 to 2.5 GHz, but other frequency spectrums are also equally suitable. In some BWA network embodiments, the frequency spectrum for the communication signals can comprise frequencies between 2 and 11 GHz.

In some embodiments, the wireless access point 404 and the wagering game machines 402 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 404 and the wagering game machines 402 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology —Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," CAN 2005 and related amendments/versions.

In some embodiments, the wireless access point 404 and the wagering game machines 402 can include one or more antennas (not shown). These antennas can comprise directional or omnidirectional antennas, including, for example, dipole antennas, monopole antennas, patch antennas, loop antennas, microstrip antennas or other types of antennas suitable for transmission of the RF signals. In some multiple-input, multiple-output (MIMO) embodiments, two or more antennas can be used. In some embodiments, instead of two or more antennas, a single antenna with multiple apertures can be used. In these multiple aperture embodiments, each aperture can be considered a separate antenna. In some multi-antenna embodiments, each antenna can be effectively separated to take advantage of spatial diversity and the different channel characteristics that can result between each of the antennas and another wireless communication device. In some multi-antenna embodiments, the antennas of a device can be separated by up to 1/10 of a wavelength or more.

In some embodiments, handoffs between different wireless access points 104 and one of the wagering game machines 402 can be performed based on a signal-to-noise ratio (SNR), a signal-to-noise and interference ratio (SNIR), a bit-error rate (BER), or an energy per received bit.

In some embodiments, the wireless access point 404 and the wagering game machines 402 can communicate in accordance with standards such as the Pan-European mobile system standard referred to as the Global System for Mobile Communications (GSM). In some embodiments, the wireless access point 404 and the wagering game machines 402 can also communicate in accordance with packet radio services such as the General Packet Radio Service (GPRS) packet data communication service. In some embodiments, the wireless access point 404 and the wagering game machines 402 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 404 and the wagering game machines 402 can provide packet data services (PDS) utilizing packet data protocols (PDP). In other embodiments, the wireless access point 404 and the wagering game machines 402 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 404 and the wagering game machines 402 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 404 and the wagering game machines 402 can communicate in accordance with an ultra-wideband (UWB) communication technique where a carrier frequency is not used. In other embodiments, the wireless access point 404 and the wagering game machines 402 can communicate in accordance with an analog communication technique. In other embodiments, the wireless access point 404 and the wagering game machines 402 can communicate in accordance with an optical communication technique, such as the Infrared Data Association (IrDA) standard. In some embodiments, the wireless access point 404 and the wagering game machines 402 can communicate in accordance with the Home-RF standard which can be in accordance with a Home-RF Working Group (HRFWG) standard.

Example Operations

This section describes operations performed by embodiments of the invention. In the discussion below, the flow diagrams will be described with reference to the block diagrams presented above. However, in some embodiments, the operations can be performed by components different from those shown in the block diagrams. In certain embodiments, the operations are performed by instructions residing on machine-readable media (e.g., software), while in other embodiments, the operations are performed by hardware and/or other logic (e.g., firmware). In some embodiments the operations are performed in series, while in other embodiments, the operations can be performed in parallel.

Figure 5:
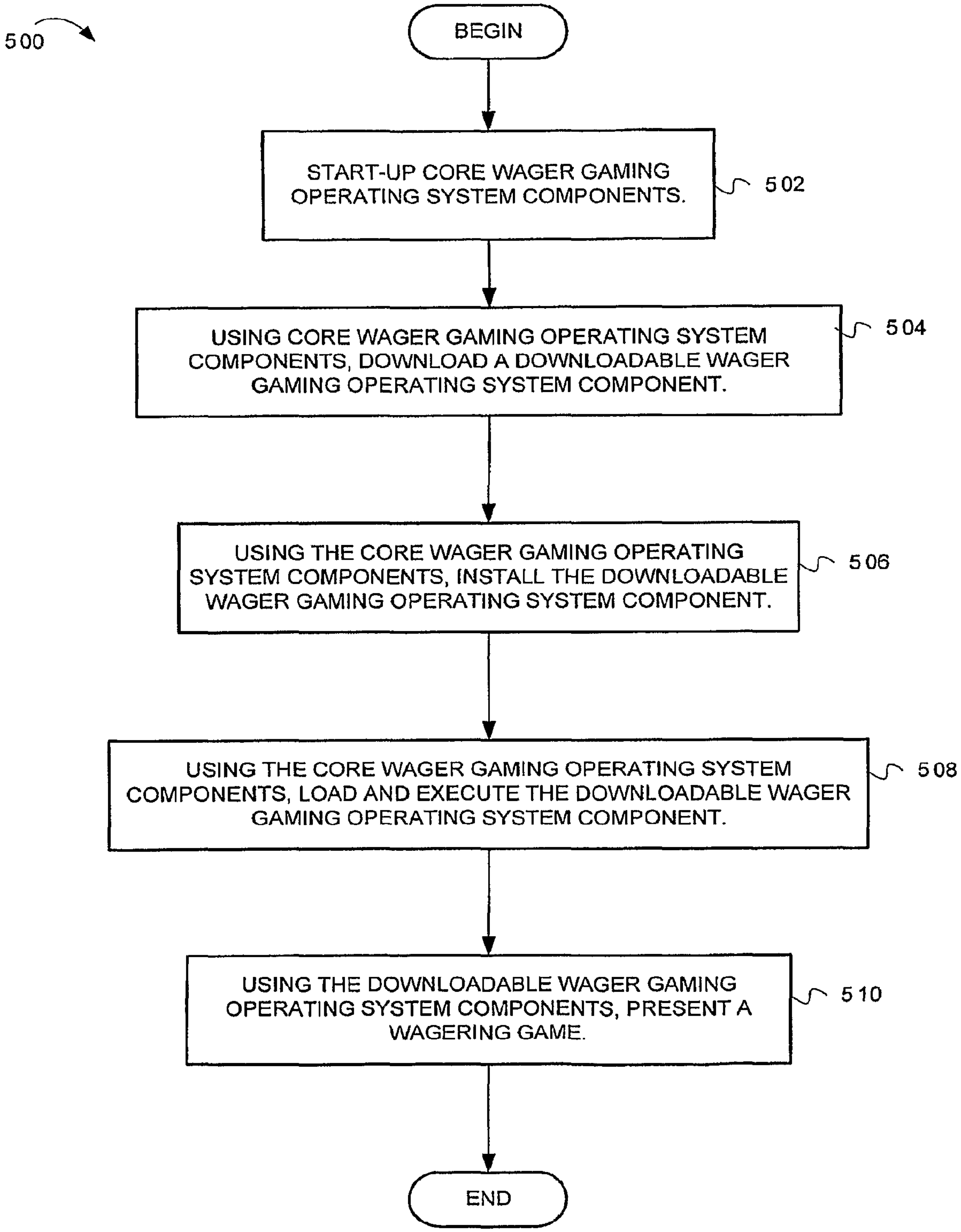
FIG. 5 is a flow diagram illustrating operations for downloading and installing a downloadable wager gaming operating system component, according to example embodiments of the invention.
Figure 6:
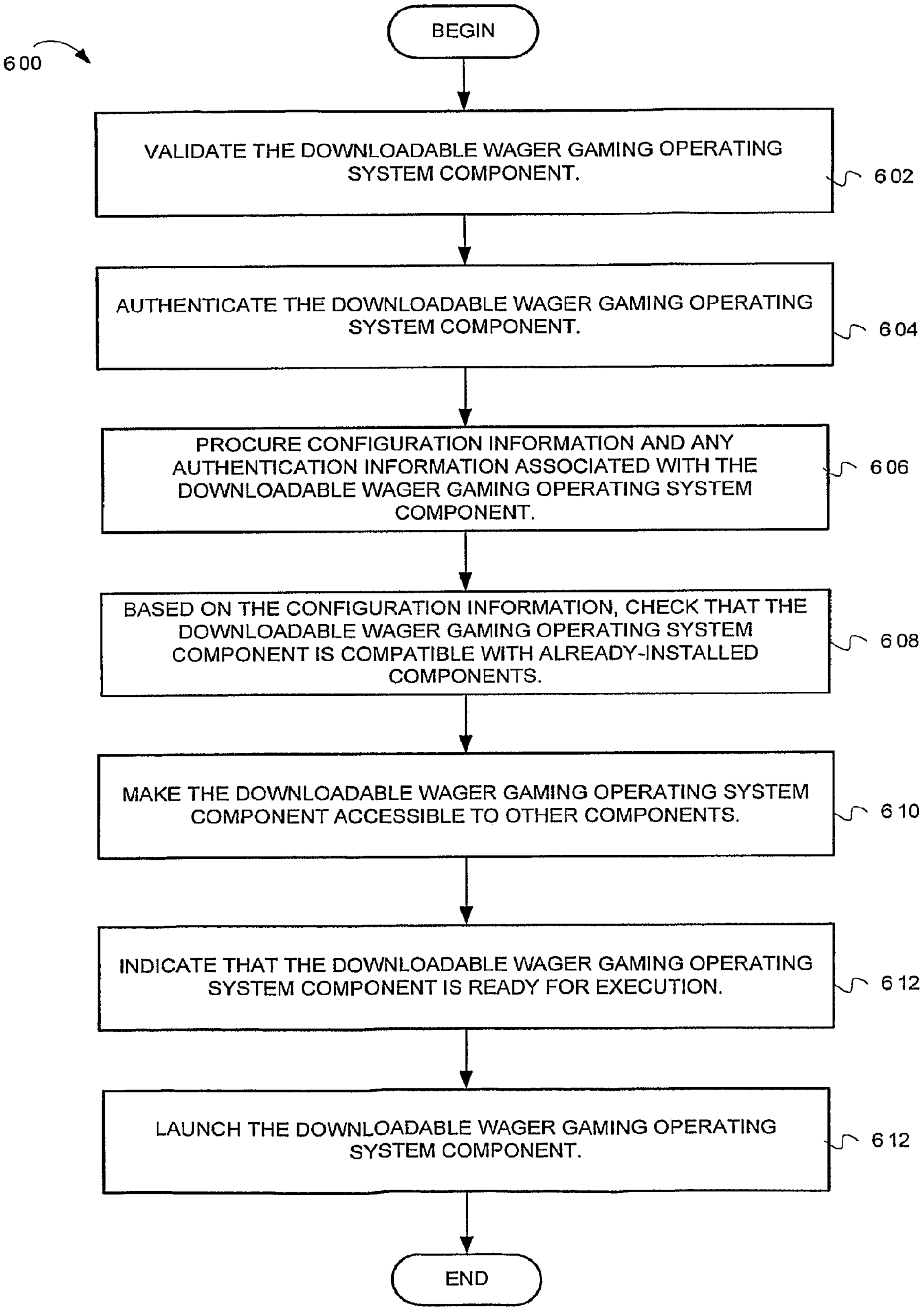
FIG. 6 is a flow diagram illustrating operations for installing a downloadable wager gaming operating system component, according to example embodiments of the invention.
Figure 7:
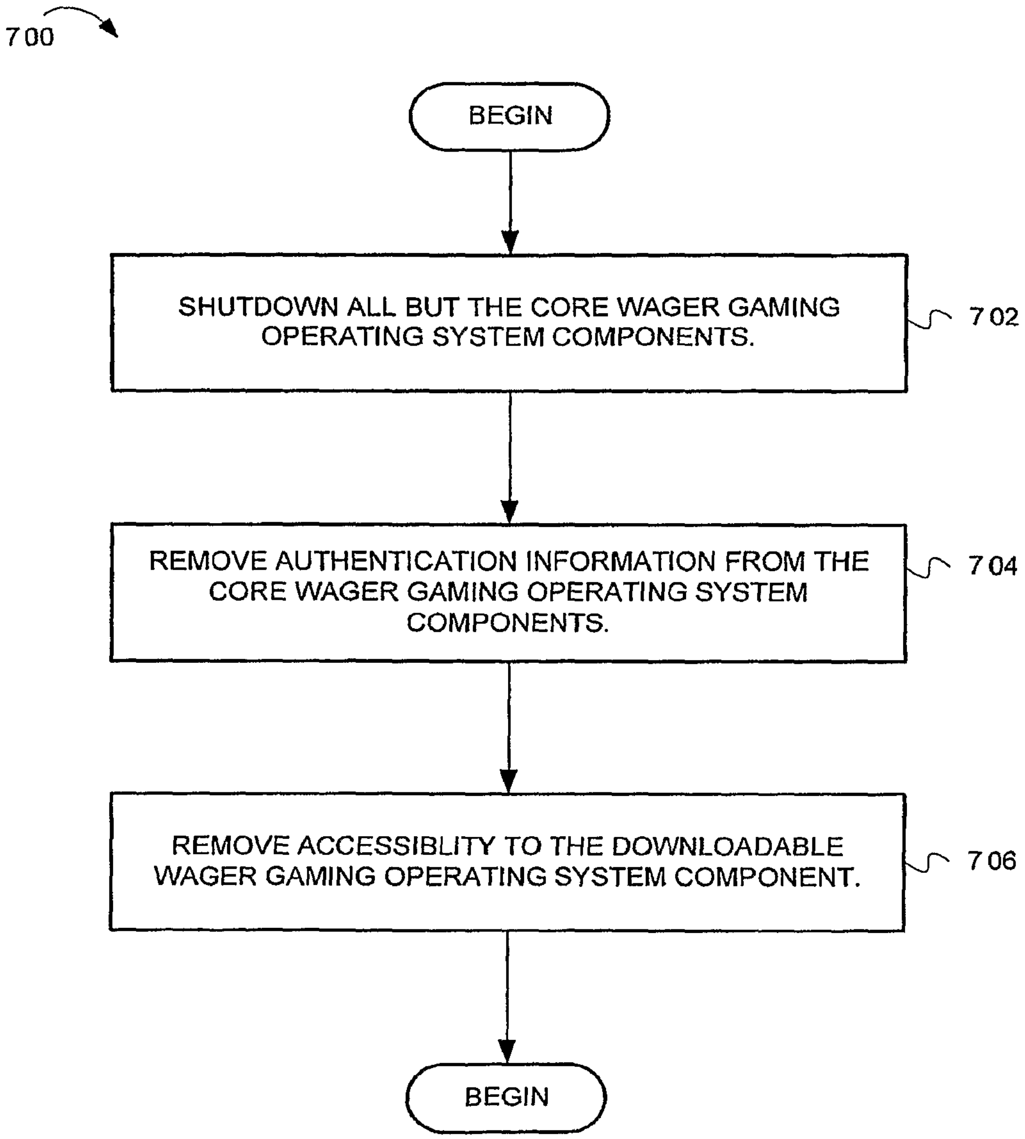
FIG. 7 is a block diagram illustrating operations for one installing a downloadable wager gaming operating system component, according to example embodiments of the invention.

This section presents FIGS. 5, 6, and 7. FIG. 5 describes operations for downloading and installing a downloadable wager gaming operating system component, whereas FIG. 6 describes the installation process in more detail. FIG. 7 describes operations for uninstalling downloadable wager gaming operating system components.

FIG. 5 is a flow diagram illustrating operations for downloading and installing a downloadable wager gaming operating system component, according to example embodiments of the invention. The flow 500 begins at block 502.

At block 502, the core operating system components are started-up. For example, a wagering game machine's BIOS 302 performs initialization routines (e.g., a power-on self test) and begins a boot sequence, which loads and executes the core wager gaming operating system components 304, such as the NVRAM manager 320, hard disk drive manager 312, and the kernel and core kernel modules 322. In one embodiment, after the boot sequence is complete, the wagering game machine is capable of executing other core operating system components, such as the download manager 330 and package manager 326. The flow continues at block 504.

At block 504, a downloadable wager gaming operating system component is downloaded using core operating system components. For example, the core wager gaming operating system's download manager 330 downloads a downloadable wager gaming operating system component from a wagering game server 406. In one embodiment, the downloadable wager gaming operating system component includes all the modules shown in FIG. 3's downloadable wager gaming operating system component 306. In another embodiment, the downloadable wager gaming operating system component can include a subset of the modules included in the component 306 and/or other modules not shown in FIG. 3. In one embodiment, the downloadable operating system component can be a file system image including a complete compact-flash-based or hard-disk-based image format, which has one or more partitions containing executable files and one or more non-partition areas containing file and/or image digital signature information. The flow continues at block 506.

At block 506, the downloadable wager gaming operating system component is installed using the core wager gaming operating system components. For example, the core wager gaming operating system's package manager 326 installs the downloadable wager gaming operating system component 306. Operations for installing a downloadable wager gaming operating system component are described in greater detail below, in the discussion of FIG. 6. The flow continues at block 508.

At block 508, the downloadable wager gaming operating system component is loaded and executed using the core wager gaming operating system components. For example, the electronic gaming machine controller 328 loads and executes the downloadable wager gaming operating system component 306. The flow continues at block 510.

At block 510, a wagering game is presented using the downloadable wager gaming operating system component. In one embodiment, the downloadable wager gaming operating system component 306 provides services (e.g., audio services, video services, game outcome determination services, etc.) useful in presenting wagering games. In one embodiment, wagers are received and/or paid-out in association with the wagering game. From block 510, the flow ends.

While FIG. 5 describes downloading and installing a downloadable wager gaming operating system component, FIG. 6 describes the installation process and more detail.

FIG. 6 is a flow diagram illustrating operations for installing a downloadable wager gaming operating system component, according to example embodiments of the invention. The flow 600 begins at block 602.

At block 602, a downloadable wager gaming operating system component is validated. In one embodiment, the downloadable wager gaming operating system component 306 can be included in a file system image including a complete compact flash or hard disk based image format, as discussed above. The core wager gaming operating system's validation unit 310 can validate the file system image by determining that it is a true and correct copy of the file system image. The file system image can include any number of other files, which constitute modules that make-up the downloadable wager gaming operating system component. The flow continues at block 604.

At block 604, the downloadable wager gaming operating system component is authenticated. For example, the validation unit 310 determines that the downloadable wager gaming operating system component 306 has been received from a trusted source. In one embodiment, the validation unit 310 uses digital signatures, which can be derived from a digital hash value corresponding to the entire file system image or parts of thereof, to authenticate the downloadable wager gaming operating system component 306. The flow continues at block 606.

At block 606, configuration information and any authentication information associated with the downloadable wager gaming operating system component are procured. In one embodiment, the package manager 326 temporarily mounts the file system image, which includes the downloadable wager gaming operating system component 306, onto the file system 315. During this temporary mount, the kernel and core kernel modules 322 can inhibit execution of any executable files contained within the file system image. After the file system image is temporarily mounted, the kernel and core kernel modules 322 read configuration and authorization information from the file system image. The configuration information can include information about where the file system image is to be permanently mounted (i.e., mount points), information about other components necessary for installing the downloadable component 306, information about what modules are included in the downloadable component 306, etc. The authentication information can also include digital signatures used for authenticating files contained within the file system image. The file system image is then unmounted from the file system 315, in preparation for the permanent mount.

At block 608, based on the configuration information, it is determined that the downloadable wager gaming operating system component is compatible with already-installed components. For example, the package manager 326 determines whether core components 304 and other components of the wagering game machine 206 will be compatible with the downloadable wager gaming operating system component 306. In one embodiment, the package manager 326 compares version numbers associated with the already-installed components and the downloadable component 306. The flow continues at block 610.

At block 610, the downloadable wager gaming operating system component is made accessible to other components. For example, the package manager 326 instructs the loading of the digital signatures (procured at block 606) into the kernel and core kernel modules 322, then mounts the downloadable component 306 onto the file system 315 at a designated mount point, as specified within the configuration information (procured at block 606). The flow continues at block 612.

At block 612, the downloadable wager gaming operating system component is indicated as being ready for execution. For example, the package manager 326 informs the electronic gaming machine controller 328 that the downloadable component 306 is ready for use. The flow continues at block 614.

At block 614, the downloadable wager gaming operating system component is launched. For example, the electronic gaming machine controller 328 loads and causes execution of the downloadable wager gaming operating system component 306. From block 314, the flow ends.

While FIG. 6 describes operations for installing a downloadable wager gaming operating system component, FIG. 7 describes uninstalling a downloadable wager gaming operating system component.

FIG. 7 is a block diagram illustrating operations for uninstalling a downloadable wager gaming operating system component, according to example embodiments of the invention. The un-install procedure may be used, for example, in preparation for upgrading a downloadable wager gaming operating system component to a newer version. The flow 700 begins at block 702.

At block 702, all but the core wager gaming operating system components are shutdown. For example, the kernel and core kernel modules 322 kill all processes that are not part of the core components 304. In one embodiment, before killing the processes, the wagering game presentation unit 354 may have to conclude a wagering game and/or cash-out a player. In one embodiment, a wagering game machine's download manager 330 may have downloaded another downloadable wager gaming operating system component before performing the operation at block 702. The flow continues at block 704.

At block 704, authentication information is removed from the core wager gaming operating system components. For example, the package manager 326 removes from the kernel and core kernel modules 322 digital signatures associated with files included in a file system image, where the file system image makes-up the downloadable component 306 (see discussion of block 606 of FIG. 6). The flow continues at block 706.

At block 706, accessibility to the downloadable wager gaming operating system component is removed. For example, the package manager 326 unmounts the file system image that includes the downloadable wager gaming operating system component 306. From block 706, the flow ends.

Example Wagering Game Machines

This section describes addition details of wagering game machines in which embodiments of the invention can be practiced.

Figure 8:
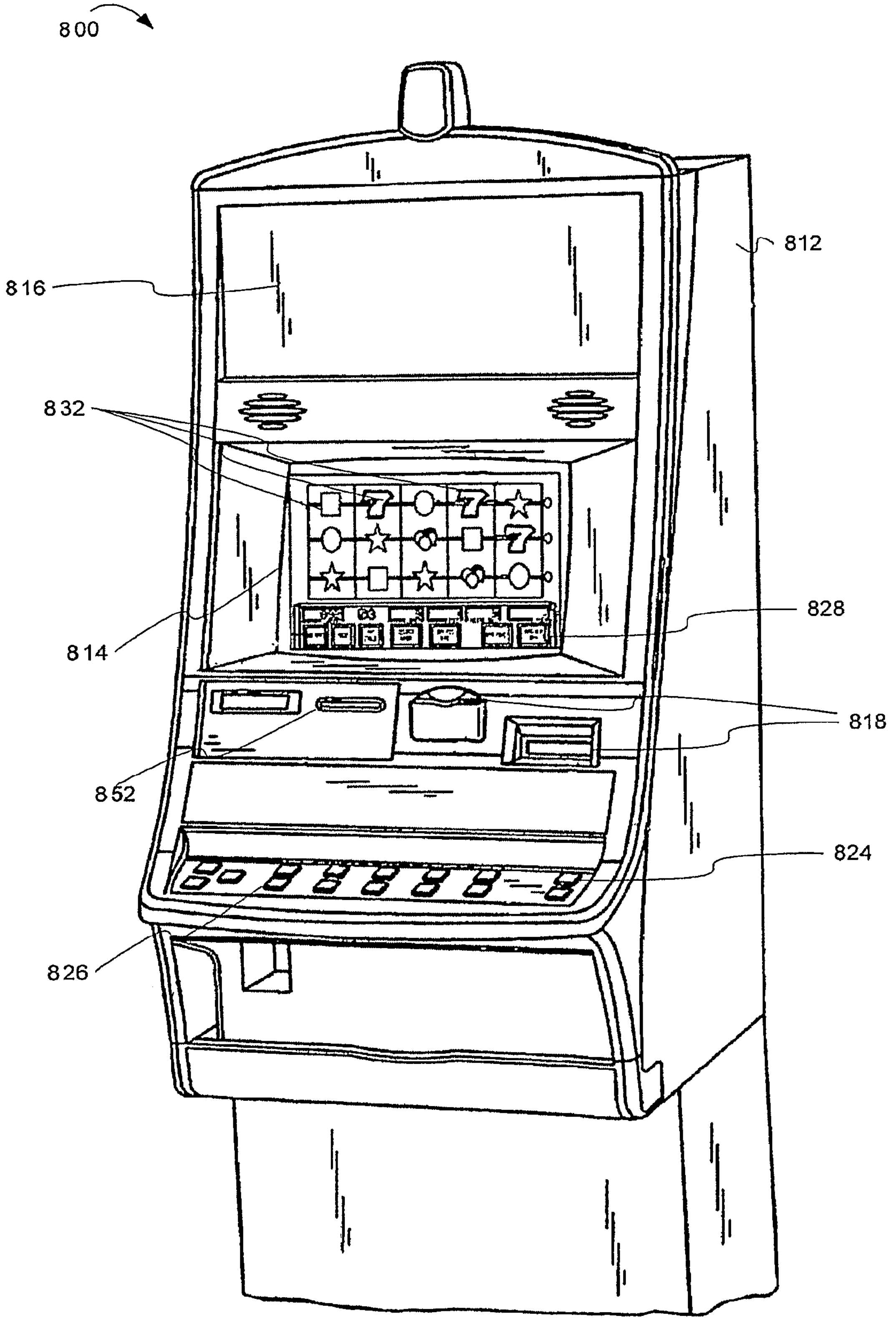
FIG. 8 is a perspective view of a wagering game machine, according to example embodiments of the invention.

FIG. 8 is a perspective view of a wagering game machine, according to example embodiments of the invention. Referring to FIG. 8, a wagering game machine 800 is used in gaming establishments, such as casinos. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824: For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

General

In the following detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The following detailed description does not, therefore, limit embodiments of the invention, which are defined only by the appended claims.

Each of the embodiments described herein are contemplated as falling within the inventive subject matter, which is set forth in the following claims.

The invention claimed is:

1. A non-transitory machine-readable medium including instructions which when executed by a wagering game machine cause the wagering game machine to perform operations comprising:

booting the wagering game machine, wherein the booting is performed in-part by core operating system components installed on a file system of the wagering game machine;

downloading, over a network, a non-core operating system component, the non-core operating system component comprising a file system image configured for integration into the file system of the wagering game machine, wherein the non-core operating system component provides services to the core operating system components, and wherein the downloading is performed with assistance from the core operating system components;

installing the non-core operating system component onto the file system of the wagering game machine, wherein the installing is performed by the core operating system components, wherein the installing includes mounting the file system image within the file system of the wagering game machine, and wherein the installing does not modify the core operating system components in the file system; and presenting a wagering game upon which monetary value can be wagered, wherein the presenting is performed in-part by the non-core operating system component.

2. The machine-readable medium of claim 1, wherein the installing makes the non-core operating system component available to application programs stored on the file system of the wagering game machine.

3. The machine-readable medium of claim 1, wherein the non-core operating system component includes a media presentation unit, operating system kernel configurator, kernel module, or fault log.

4. The machine-readable medium of claim 1, wherein the non-core operating system component includes files and digital signatures.

5. The machine-readable medium of claim 4, wherein the installing includes configuring the core operating system to use the digital signatures for authenticating the files when the files are accessed.

6. The machine-readable medium of claim 1, wherein the installing is completed without a rebooting of the wagering game machine.

7. The machine-readable medium of claim 6, wherein the installing is performed and is completed with a background operation while the wagering gaming machine is presenting one or more wagering games.

8. A method comprising:

downloading, over a network, a file system image, wherein the file system image includes files that constitute a downloadable wager gaming operating system component for use in a wager gaming operating system, wherein the downloading occurs by using core components of the wager gaming operating system;

mounting, with the core components of the wager gaming operating system, the file system image onto a file system accessed by the wager gaming operating system, wherein mounting of the file system image does not modify the core components of the wager gaming operating system in the file system;

configuring the downloadable wager gaming operating system component based on information included in the files;

launching the downloadable wager gaming operating system component in the wager gaming operating system using the core components of the wager gaming operating system; and presenting a wagering game upon which monetary value can be wagered using the wager gaming operating system, wherein the presenting is performed in part by the downloadable wager gaming operating system component.

9. The method of claim 8,further comprising:

storing digital signatures from the file system image, wherein the digital signatures are for use in authenticating the files when they are opened in the course of the presenting the wagering game.

10. The method of claim 8, wherein the downloadable wager gaming operating system component includes software for presenting media, managing memory, configuring an operating system kernel, or recording faults.

11. The method of claim 8,further comprising:

validating the file system image;

authenticating the file system image based on a digital signature associated with the file system image.

12. The method of claim 8, wherein after the configuring, the downloadable wager gaming operating system component is operable to function in coordination with the core components of the wager gaming operating system.

13. An apparatus comprising:

a main memory including, core wager gaming operating system components including, a download manager configured to download a downloadable wager gaming operating system component over a communications network, the downloadable wager gaming operating system component comprising a file system image;

a file system configured to organize files included in the file system image of the downloadable wager gaming operating system component;

an installation manager configured to mount the downloadable wager gaming operating system component onto the file system, wherein mounting of the downloadable wager gaming operating system component does not modify the core wager gaming operating system components in the file system; and a central processing unit configured to execute the downloadable wager gaming operating system component.

14. The apparatus of claim 13, wherein the file system image is based on a hard disk drive file system format.

15. The apparatus of claim 13, wherein the file system image is based on a compact flash RAM file system format.

16. The apparatus of claim 15, wherein the core wager gaming operating system components include a kernel, and wherein the digital signatures are stored in the kernel.

17. The apparatus of claim 15, wherein the core wager gaming operating system components include a kernel, and wherein the kernel is configured to authenticate the files using the digital signatures.

18. The apparatus of claim 13, wherein the downloadable wager gaming operating system component includes files and digital signatures for authenticating the files.

* * * * *

UNITED STATES PATENT AND TRADEMARK OFFICE

CERTIFICATE OF CORRECTION

PATENT NO. : 8,043,160 B2
APPLICATION NO. : 12/299692
DATED : October 25, 2011
INVENTOR(S) : Ranjan Dasgupta It is certified that error appears in the above-identified patent and that said Letters Patent is hereby corrected as shown below:

On Sheet 6 of 8, below Reference Numeral 612, Figure 6, line 1, delete "612" and insert -- 614 --, therefor.

On Sheet 7 of 8, Reference Numeral 706, Figure 7, line 1, delete "ACCESSIBLITY" and insert -- ACCESSIBILITY --, therefor.

In column 3, line 31, delete "kernal" and insert -- kernel --, therefor.

In column 10, line 37, delete "824:" and insert -- 824. --, therefor.

In column 13, line 4, in Claim 9, delete "8,further" and insert -- 8, further --, therefor.

In column 13, line 12, in Claim 11, delete "8,further" and insert -- 8, further --, therefor.

Signed and Sealed this
Tenth Day of January, 2012

David J. Kappos
*Director of the United States Patent and Trademark Office*